United States Patent [19]

Hakoyama

[11] Patent Number: 4,560,993

[45] Date of Patent: Dec. 24, 1985

[54] THERMAL PRINTING METHOD AND THERMAL PRINTER

[75] Inventor: Akiyoshi Hakoyama, Hitachi, Japan

[73] Assignee: Hitachi, Ltd., Tokyo, Japan

[21] Appl. No.: 586,805

[22] Filed: Mar. 6, 1984

[30] Foreign Application Priority Data

Mar. 7, 1983 [JP] Japan .................................. 58-35914

[51] Int. Cl.[4] .............................................. G01D 15/10

[52] U.S. Cl. ................................ 346/76 PH; 346/1.1

[58] Field of Search ........................... 346/1.1, 76 PH; 219/216

[56] References Cited

U.S. PATENT DOCUMENTS 4,251,822 2/1981 Hara et al. ................. 346/76 PH X
4,364,063 12/1982 Anno et al. .................... 346/76 PH
4,415,907 11/1983 Suemori ......................... 346/76 PH
4,428,690 1/1984 Mita ........................... 346/76 PH X
4,464,669 8/1984 Sekiya et al. .................... 346/76 PH
4,492,482 1/1985 Eguchi et al. ............. 346/76 PH X
4,502,056 2/1985 Matsuda :......................... 346/76 PH
4,514,738 4/1985 Nagato et al. ................. 346/76 PH

*Primary Examiner*—George H. Miller, Jr.
*Attorney, Agent, or Firm*—Antonelli, Terry & Wands

[57] ABSTRACT

A thermal printer comprises a plurality of thermal elements incorporated in a printing head. The thermal elements are pre-heated in dependence on logical product of data derived through inversion of data printed in the preceding cycle and data to be printed in the instant cycle, to thereby prevent excessive temperature rise in the printing head and suppress the power consumption to a minimum.

5 Claims, 9 Drawing Figures

THERMAL PRINTING METHOD AND THERMAL PRINTER

This present invention relates to a thermal printing method and a thermal printer. In particular, the invention concerns a thermal printing method which is preferably suited for driving a printing head of a coloration or transfer type thermal printer at a high speed and a thermal printer for carrying out the method.

In the hitherto known serial type high-speed thermal printers, the quality of printed image tends to be degraded under influence of temperature distribution produced in the preceding printing cycle due to insufficient cooling period intervening the successive printing cycles, because the thermal elements incorporated in the printing head must be driven at a shorter interval in order to meet the requirement of the high-speed operation.

As an attempt to solve the problem mentioned above, there have been adopted various methods of correctively modifying the electric power applied to the individual thermal elements in dependence on the precedingly prevailing states thereof. This method may be referred to as the past-data-based correcting method. Such conventional method is shown in Japanese Patent Application Laid-Open No. 52-109946.

Among the past-data-based correcting methods known heretofore, there can be mentioned a method of electrically pre-heating the thermal elements in accordance with data derived through inversion of the data printed in the preceding cycle. This method is considered to be most useful in respect that a circuit for controlling the power applied to the individual thermal elements is not required while correction can be accomplished with significant effect.

However, in the past-data-based printing method of the prior art, the pre-heating operation of the thermal element is performed even in case the data to be printed is "0" (indicating that data to be printed is absent) when the data printed in the preceding print cycle is "0".

If the influence of the past printing cycles is accumulated for each dot, the pre-heating operation in the sense mentioned above will be meaningful. However, since heat is in reality transferred to peripheries, control of the power applied to each thermal element in consideration of the past printing cycle is of significance only immediately before the printing cycle which is to be effected instantly.

In other words, the pre-heating effected for the succeeding data of "0" will result merely in unnecessary rise in temperature of the printing head, involving useless power consumption and adverse influence to the quality of printed image.

It is further noted that the rise in temperature of the printing head will readily give rise to occurrence of partial overlap between the adjacent images as printed, the power for the pre-heating can not be set at a high level. As the consequence, limitation is necessarily imposed on the latitude of control for the pre-heating phase.

By the way, it is heretofore known that a shift register for storing data to be printed and circuit elements for switching currents flowing to the heat generating resistor elements constituting the thermal elements in dependence on the parallel outputs of the shift register are integrated in the form of a driver IC which is mounted on the printing head with a view to reducing the number of leads led out from the printing head.

When the aforementioned past-data-based correction is to be performed by using the printing head packaged with the driver IC, the new data to be printed have to be transferred in series on the way of electrical energization of the thermal elements after the data derived through inversion of the data printed precedingly have been serially transferred, requiring thus two serial data transfers. As the consequence, time taken for the data transfer is increased, which means that the time for the electrical energization is correspondingly restricted, to a disadvantage, and that efficiency of the correction by the pre-heating is degraded due to the data transfer phase which intervenes between the pre-heating operation and the intrinsic printing operation, to another disadvantage.

In this connection, it is noted that in order to spare the data transfer intervening between the preheating period and the printing period, the driver IC incorporated in the printing head has to be imparted with the capability to store the data printed in the preceding printing cycle in the inverted form together with a function to change over the pre-heating operation performed on the basis of the inverted data as stored with the printing operation performed for the new data to be printed.

To this end, the hitherto known driver IC is provided with data latches 503 which constitute a register for data for the pre-heating and a shift register 505 for storing data to be printed, as is shown in FIG. 1 of the accompanying drawings. Data for the pre-heating and the data to be printed are previously transferred to the latches 503 and the shift register 505, respectively, to be stored therein through a data input terminal 209. On these conditions, power supply is initiated in response to a strobe signal supplied from a strobe input terminal 203 through an inverter 507. On the way of the electric energization, the pre-heating data is changed over to the printing data in response to a latch signal applied to a latch input terminal 205. This system suffers, however, from two disadvantages described above, i.e. restriction of the energizing period and degradation of effectiveness of the pre-heating correction. In FIG. 1, 51 denotes heat generating resistor elements, 501 denotes NAND drivers, 201 denotes an input terminal supplied with a voltage of +12 V, 207 denotes a latch reset input terminal, and 211 denotes a clock input terminal.

An object of the present invention is to provide a thermal printing method which is capable of improving the quality of images printed out by a serial type high-speed thermal printer.

Another object of the invention is to provide a thermal printing head which can be used in carrying out the inventive method and is provided with a driver circuit suited for performing the past-data-based correction of the power supplied to the thermal elements for the pre-heating thereof.

There is proposed according to an aspect of the invention a method of thermally printing data on a recording sheet such as paper by a plurality of thermal elements disposed on a printing head and electrically heated selectively in accordance with the data to be printed, wherein each of the plural thermal elements is pre-heated in dependence on the logical product of data derived through inversion of data printed precedingly and data to be printed instantly.

According to another aspect of the invention, there is proposed a thermal printer including a printing head provided with a driver circuit which is adapted to electrically heat a plurality of thermal elements disposed on the printing head for printing data on a recording sheet and which comprises a first register for storing data to be printed out and outputting said data in parallel, a second register for storing the output data from the first register and outputting in parallel the data in inverted form, and switching means for switching currents flowing to the thermal elements in dependence on the logical product of plural signals including the outputs of the first and the second registers.

As an attempt to overcome the two drawbacks mentioned hereinbefore, it is contemplated with the present invention that the inverted data is directly derived from the printing data already transferred in the preceding cycle by taking advantage of the inverting function of the register for the pre-heating data. By driving the thermal elements in dependence on the logical product of the inverted data and the data to be printed, data for the pre-heating operation (i.e. the logical product of the inversion of the precedingly printed data and the data to be printed) can be exchanged with the data to be printed in a simplified circuit configuration (in response to a latch reset signal).

By using the data for pre-heating thus prepared in accordance with the invention, the heat generating resistor elements for which the data to be printed is "0" (i.e. absent) are not subjected to the pre-heating as in the case of the hitherto known method, whereby useless power consumption as well as temperature rise of the printing head can be decreased. Further, since the dots not to be printed produce no coloration, the width of the pre-heating period can be selected with high freedom, to further advantages.

The above and other objects, features and advantages of the invention will be more apparent when reading the following description taken in conjunction with the accompanying drawings, in which.

Now, description will be made of a thermal printing method according to the present invention and a thermal printer used in carrying out the method by referring to FIGS. 2 to 8.

The thermal printer according to an embodiment of the invention is generally composed of a printing mechanism and a controller, and is operated in response to the output of a word processor or the like through an input/output device.

Figure 2:
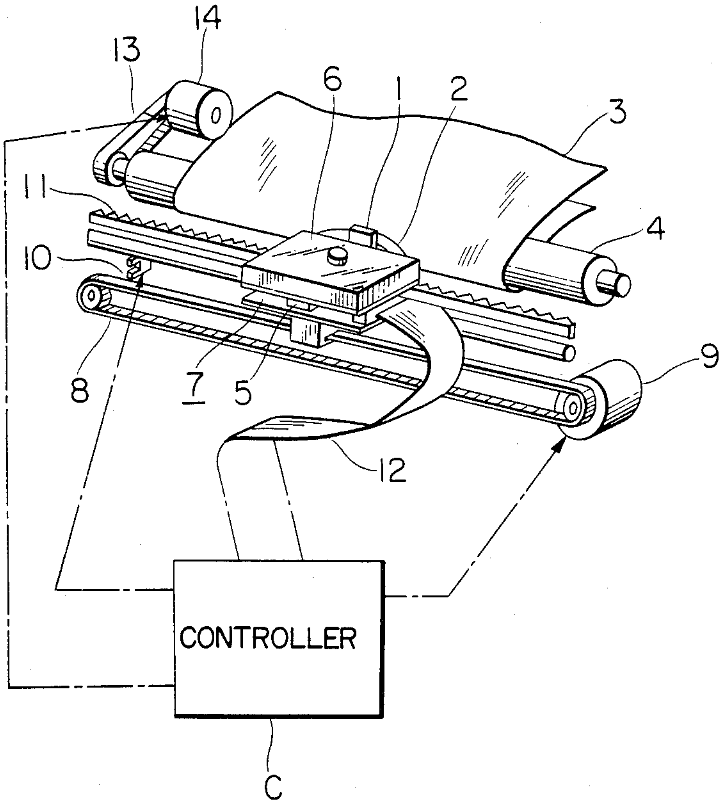
FIG. 2 is a perspective view showing a printing mechanism of a transfer type thermal printer according to an embodiment of the invention.

More particularly, reference is first made to FIG. 2, in which a reference numeral 1 denotes a thermal print head, 2 denotes an ink ribbon, and 3 denotes a recording paper or sheet to be printed. By electrically energizing heat generating resistance elements of the thermal print head 1 which will be hereinafter described in detail, solid ink carried on the ink ribbon 2 is molted to be transferred onto the recording paper 3, effecting thereby the printing.

A numeral 4 denotes a platen roller, and 5 denotes a traction solenoid which serves for pressing the thermal print head 1 against the platen roller 4 to thereby bring the thermal print head 1, the ink ribbon 2 and the recording sheet 3 in close contact with one another.

A ribbon cassette 6, the thermal print head 1 and the traction solenoid 5 are mounted on a carriage 7 which is moved to the left and the right by means of a pulse motor 9 by way of a timing belt 8. The printing is allowed to take place only when the carriage is moved from the left to the right. This sort of printing is referred to as the unidirectional printing system.

Under the control of the timing belt 11, the ink ribbon 2 is dispensed and wound up in synchronism with the movement of the carriage 7 which is so arranged that the ink ribbon 2 can be dispensed and wound up only when the carriage 7 is moved to the right in the state where the traction solenoid 5 is pressing the thermal print head 1 to the roller.

A reference numeral 10 denotes a home position sensor for detecting a reference position of the carriage 7, a numeral 12 denotes a flat cable, 13 denotes a timing belt, 14 denotes a pulse motor, C denotes the controller, and single-dot broken lines represent objectives to be controlled by the controller C.

Figure 3:
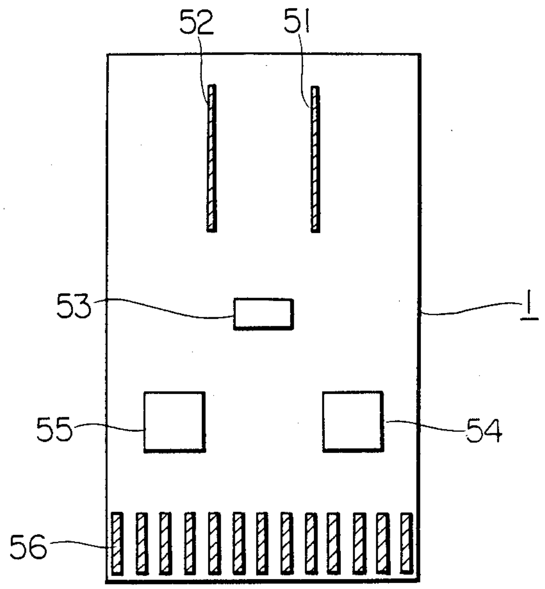
FIG. 3 is an enlarged schematic view of a thermal head of the printer.

FIG. 3 shows schematically a structure of the thermal print head 1. In this figure, reference numerals 51 and 52 denote heat generating resistance elements, 54 and 55 denote driver ICs for the thermal print head, 53 denotes a thermister, and 56 denotes a terminal array.

Figure 4:
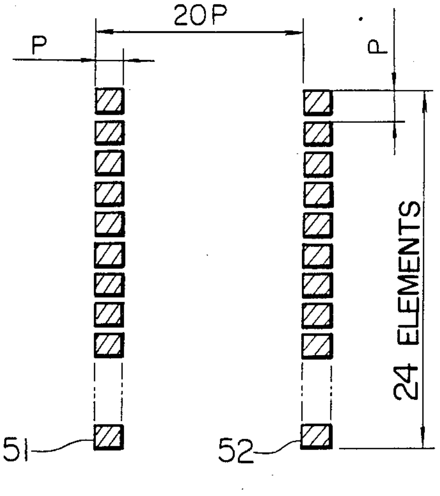
FIG. 4 is an enlarged schematic view showing an arrangement of heat generating resistor elements of the thermal printing head shown in FIG. 3.

Referring to FIG. 4, two rows of the heat generating resistor elements 51 and 52 are disposed in parallel to each other with a distance of 20/180 inches or 2.82 mm (i.e. $20\times P$ where $P=1/180$ inches) therebetween, wherein each of the heat generating resistor elements 51 and 52 is divided into 24 segments at a pitch P of 1/180 inches (0.14 mm).

Figure 5:
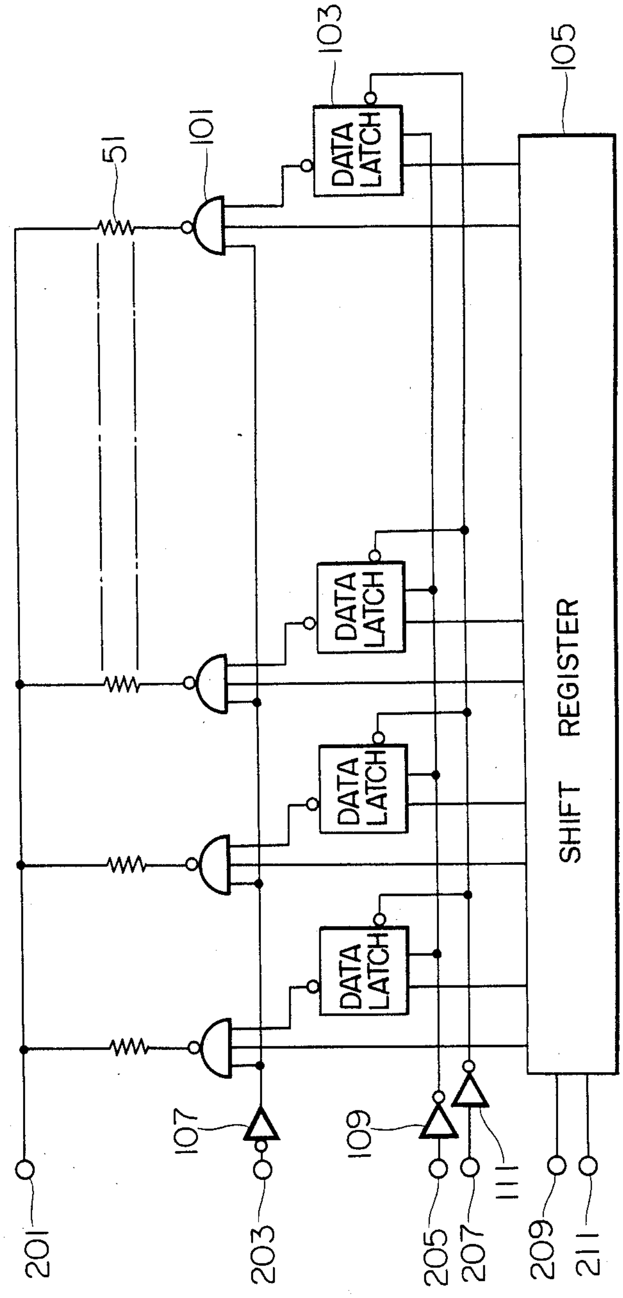
FIG. 5 is a circuit diagram of the thermal printing head shown in FIG. 3.

FIG. 5 shows a circuit arrangement of the thermal print head 1, wherein the heat generating resistor segments are symbolically represented.

Referring to FIG. 5, elements denoted by odd numerals 101 to 111 are circuit elements which constitute the driver IC 54. A reference numeral 101 denotes NAND drivers, 103 denotes data latches, 105 denotes a shift register, and 107 to 111 denote inverters, respectively. Further, 201 to 211 denote typical terminals of the terminal array 56. A numeral 201 denotes an input terminal applied with a voltage of +12 V and connected in common to all the segments of the heat generating resistor 51, a numeral 203 denotes a strobe input thermal connected in common to the inputs of the NAND drivers 101 through the inverter 107, and numeral 205 denotes a latch input terminal connected in common to the latch inputs of the data latches 103 through the inverter 109. A numeral 207 denotes a latch reset input terminal connected in common to the reset terminals of the data latches 103 through an inverter 111. Numerals 209 and 211 denote, respectively, a data input terminal and a clock input terminal of the shift register 105.

The aforementioned shift register 105 constitutes the first register which stores data to be printed out and outputs the data in parallel, while the data latches 103 constitute a second register adapted to store the parallel output data of the first shift register 105 to thereby produce the data to be outputted in parallel after inversion.

The NAND drivers 101 constitute the means for switching the heating current in dependence on the logical product of plural input signals such as the output signals of the shift registers 105 and the data latches 103 and the strobe signal applied through the strobe input terminal 203 and the inverter 107.

Although FIG. 5 shows only the circuit arrangement for the heat generating resistor 51 and the driver IC 54, it should be understood that a same circuit configuration may equally be adopted for the heat generating resistor 52 and the driver IC 55.

Figure 6:
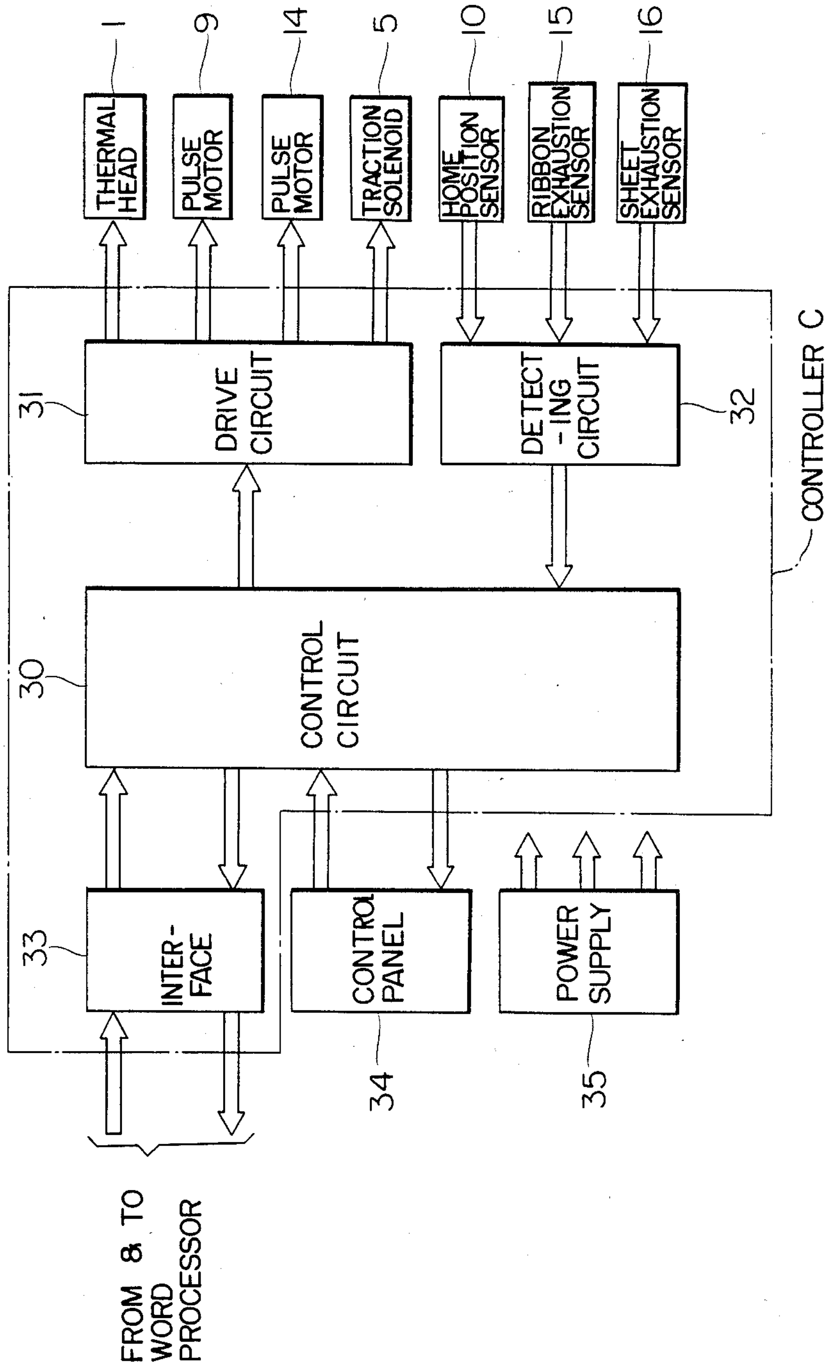
FIG. 6 is a block diagram showing a circuit arrangement of a controller for the transfer type thermal printer shown in FIG. 3.

FIG. 6 shows in a block diagram a circuit arrangement of the controller C. In the figure, blocks 1, 9, 14, 5 and 10 represent, respectively, the thermal print head, pulse motor, traction solenoid and the home position sensor described hereinbefore in conjunction with FIG. 2.

Figure 1:
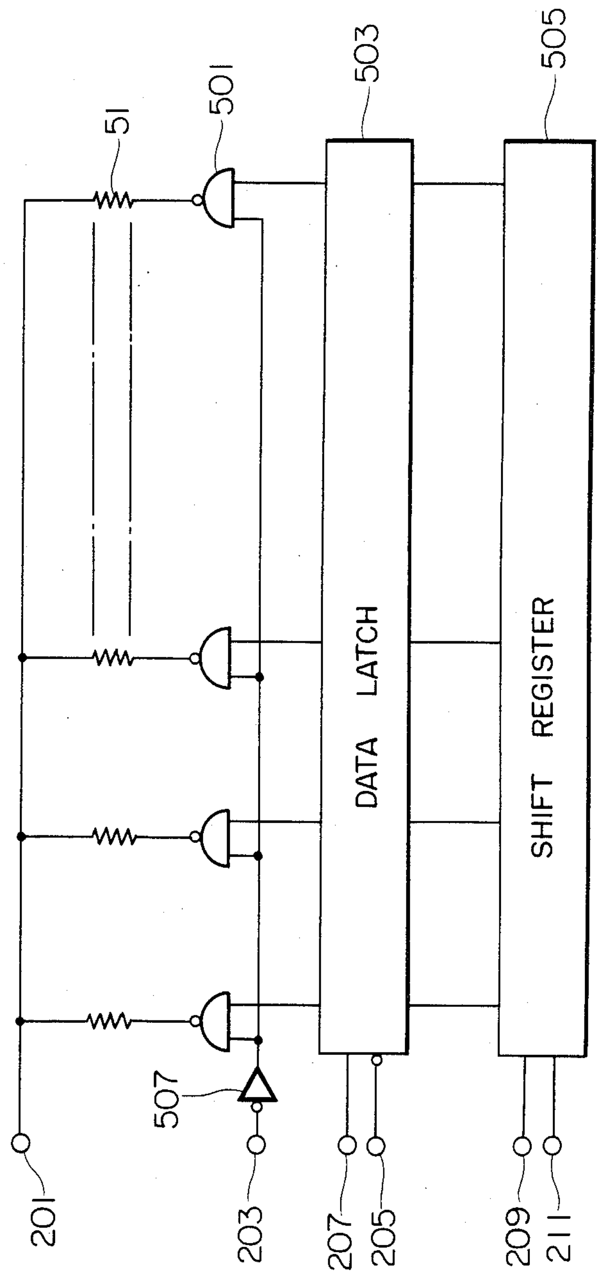
FIG. 1 PRIOR ART
FIG. 1 is a block circuit diagram showing an arrangement of a controller of a hitherto known thermal printer.

In FIG. 6, a numeral 15 denotes a ribbon exhaustion sensor mounted on the carriage 7 shown in FIG. 1 for detecting the presence or absence of the ribbon 2 in the ribbon cassette 6, and 16 denotes a sheet exhaustion sensor for detecting the presence or absence of the recording paper or sheet 3.

A numeral 30 denotes a control circuit inclusive of a microprocessor destined for the supervisory control.

A reference numeral 31 denotes a drive circuit for driving the thermal print head 1, the pulse motors 9 and 14 and the traction solenoid 5 in response to the respective control signals supplied by the control circuit 30. A detection circuit 32 serves for detecting the analogue output signals of the home position sensor 10, the ribbon sensor 15 and the sheet sensor 16 to thereby convert the analogue signals to the digital signals which are then supplied to the control circuit 30. Reference numeral 33 denotes an interface circuit, 34 denotes a control panel, and 35 denotes a power supply circuit.

The interface circuit 33 is inputted with print data (i.e. data to be printed out) from an external machine such as a word processor. Further, the interface circuit serves to control the signal transfer to the external equipments from the controller C.

Next, description will be made of a thermal printing method which is effected with the aid of the hardware of the structure described above.

In the printing operation for printing out the input data, the thermal print head 1 is caused to move to the right at a predetermined speed while pressing the ink ribbon 2 against the recording sheet or paper.

In this state, the heat generating resistors 51 and 52 of the thermal print head 1 are alternately energized, whereby characters or sections of graph each of 24×24 dots in width and length are produced on the recording sheet as the result of synthesization of the print patterns applied by the resistor elements 51 and 52.

More specifically, the heat generating resistor element 51 is destined for printing the odd-numbered rows of a pattern while the resistor element 52 is destined to print the even-numbered rows of a pattern.

Since operation of the heat generating resistor elements 51 and 52 are identical with each other except that they are operated alternately, the following description will be made typically only of the operations of the heat generating resistor 51 and the driver IC 54.

Figure 7:
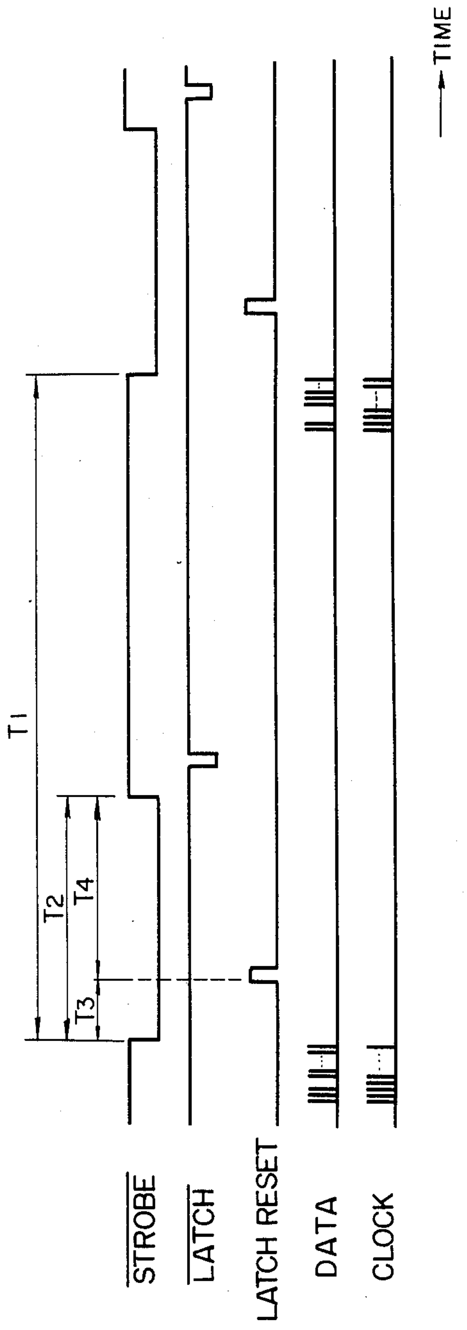
FIG. 7 is a signal waveform diagram showing waveforms of input signals to the circuit of the thermal printing head shown in FIG. 3.

FIG. 7 illustrates waveforms of signals applied to the various input terminals shown in FIG. 5.

The signal $\overline{\text{STROBE}}$ is a common input signal to the NAND drivers 101, defining the timing at which the heat generating resistor element 51 is electrically energized.

More specifically, a drive pulse of a pulse duration or width $T_2$ is applied to the common input of the NAND drivers 101 periodically at an interval $T_1$. In this connection, it should be noted that in precedence to the application of the enabling pulse $T_2$, the print data have been transferred to the shift register 105 in response to the data signal and the clock signal and that the print data loaded in the shift register 105 in the preceding cycle have been transferred to the data latches 103 from the shift register 105 in response to a signal $\overline{\text{LATCH}}$ Since each of the NAND drivers 101 has an input supplied with the inverted output of the associated data latch 103, the electric energization of the heat generating resistor element 51 for a period $T_3$ is performed in accordance with the logical product of the data derived through inversion of the data printed in the preceding print cycle and the data to be newly or instantly printed.

More specifically, the pre-heating drive for compensating or correcting influence of the temperature distribution produced in the preceding printing cycle is performed only for the heat generating resistor segments for which the print data are logic "1" (indicating that data to be printed out is present). In other words, the heat generating resistor segments which were heated upon the data printing in the preceding cycle and for which the data to be subsequently printed are absent or logic "0", the pre-heating is not carried out to prevent the increasing in temperature and the power consumption.

On the other hand, when the latch reset signal is made use of, the inverted outputs of the data latches 103 are all "1", resulting in that the electrical energization is effected in accordance with the output data of the shift register 105 during a period $T_4$ shown in FIG. 7.

The aforementioned printing process according to the invention is summarized in the following table 1.

TABLE 1

| | | 1 | 2 | 3 | 4 | 5 | 6 |
|---|---|---|---|---|---|---|---|
| 1 | Preceding Data Printed ($D_1$) | 1 | 0 | 0 | 1 | 1 | 0 |
| 2 | Inverted Data of Latch ($D_2$) | 0 | 1 | 1 | 0 | 0 | 1 |
| 3 | Instant Print Data ($D_3$) | 0 | 1 | 0 | 1 | 0 | 1 |
| 4 | Logical Product ($D_4$) of $D_2$ and $D_3$ | 0 | 1 | 0 | 1 | 0 | 1 |
| 5 | Pre-Heating | absent | present | absent | present | absent | present |

More particularly, when the preceding print data ($D_1$) and the instant print data ($D_3$) are such as indicated at columns 1 to 6 of the above table for given heat generating resistor segments, the inverted latch data $D_2$, the logical product of $D_2$ and $D_3$ and the presense or absence of the pre-heating are such as illustrated in the corresponding columns of the above table.

It will be seen that when the printing have been performed in the preceding cycle, the pre-heating is not effected (refer to columns 1 and 5) unless the printing is to be effected in the instant cycle. Further, in case the printing is not performed both in the preceding and instant cycles (refer to the column 3), no pre-heating is carried out.

On the other hand, when the printing is to take place in the instant cycle, the pre-heating is always effected regardless of whether the printing has been performed in the preceding cycle or not (refer to columns 2, 4 and 6).

In this way, according to the thermal printing method described above, the pre-heating for compensating for or correcting the influence of the temperature distribution produced by the preceding printing cycle is effected only for the heat generating resistor segments for which the print data (i.e. data to be printed) are present as indicated by "1". In this connection, examination will be made below concerning the thermal response characteristic of the thermal print head by referring to FIG. 8.

Figure 8:
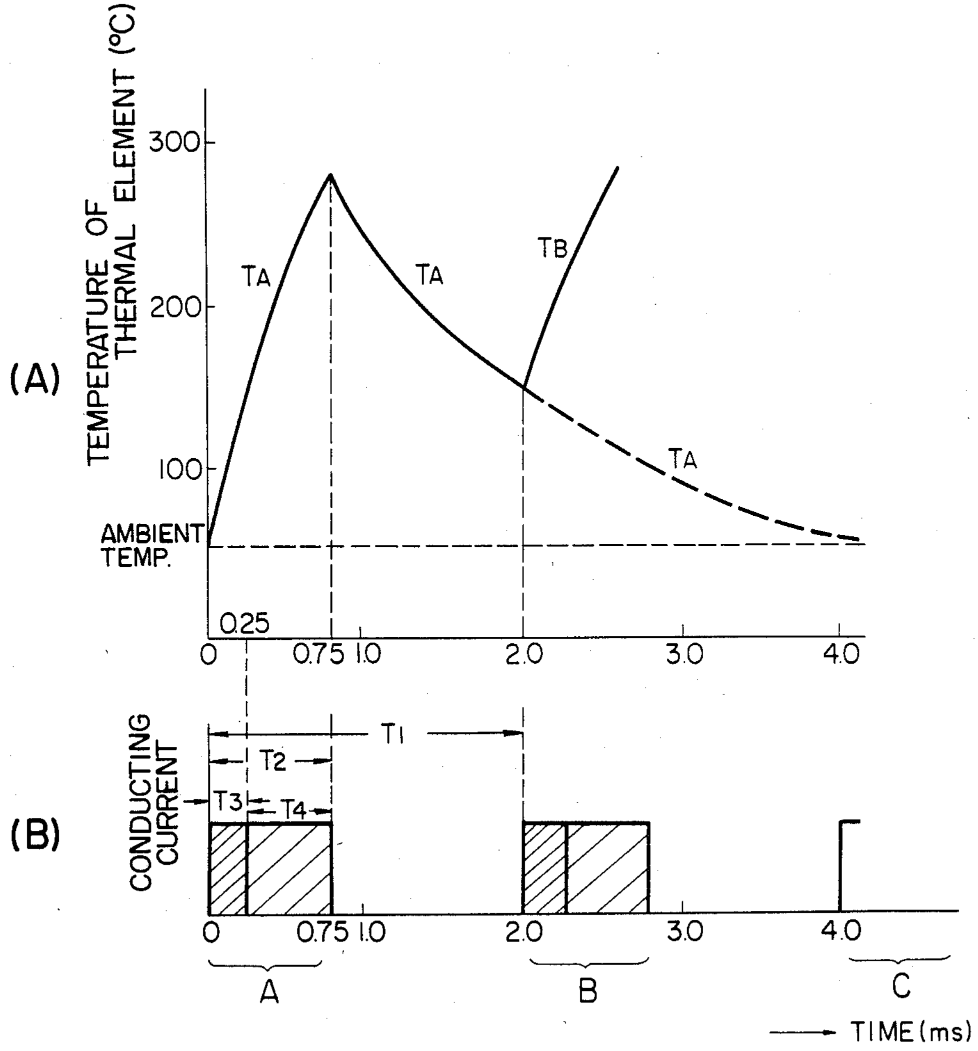
FIG. 8 shows graphically a thermal response characteristic of the printing head.

In FIG. 8, the thermal response of the thermal print head is illustrated at FIG. 8(A), while the energizing current pulses are illustrated at FIG. 8(B) on the assumption that electric energization of 0.75 ms in duration ($T_2$) takes place periodically at the time interval ($T_1$) of 2 ms for one row of the heat generating resistor segments. The symbol $T_3$ represents the duration of energization for the pre-heating, and $T_4$ represents the duration of energization for the data printing.

As will be seen from FIG. 8(A), the temperature rise $T_A$ brought about by a first energizing pulse A is lowered substantially to a level approximating the initial ambient temperature at a time point when the third energizing pulse C makes appearance.

Accordingly, the energizing pulse of a constant width or duration may be applied to the heat generating resistor element regardless of the printed data in the immediately preceding cycle, provided that the energizing pulse is applied at the period of 4 ms.

However, the application of the energizing pulse at such a long interval of 4 ms will necessarily result in a low-speed operation. Accordingly, in order to realize a high-speed operation, the present invention teaches that the energizing pulse is applied at such a shortened interval or period that the influence of temperature produced by the preceding energization pulse still remains and that the compensation or correction is made in consideration of the data printed in the immediately preceding cycle as described above.

Next, advantageous effects provided by the illustrated embodiment of the invention will be described in concrete on the basis of the results of experiments conducted by the inventor.

In the experiment, the energizing duration for the pre-heating was selected equal to 250 μs, the energizing duration for the printing was 500 μs, the applied power was 0.9 W/dot and the energization period was 1 ms for the 240 dot matrix.

On the assumption that an image is printed at the dot ratio of 15% (quotient of the number of energized dots divided by the total number of dots), the power saved by carrying out the illustrated embodiment of the invention is determined as follows.

The applied power is 0.81 $W=(0.25\times10^{-3}\times0.9\times24\times0.15)/(1\times10^{-3})$ in the case of the embodiment of the invention, while the applied power is 2.43 $W=(0.75\times10^{-3}\times0.9\times24\times0.15)/(1\times10^{-3})$ in the case of a thermal printer of the prior art. It is thus seen that the power saving of about 33% can be accomplished.

Since the thermal capacity of the printing head according to the illustrated embodiment is 11.2 J/deg inclusive of the heat sink, rate of reduction in the temperature rise of the printing head is $7.23\times10-2$ deg/s due to the power saving of 0.81 W.

When the printing speed is set at 40 cps corresponding to 2500 characters/A4 (size of the recording sheet), the useless temperature rise amounts to 4.52 deg for printing a sheet of 4A in size. Thus, a great advantage is obtained in the continuous operation with respect to the power consumption.

From the foregoing description, it will be understood that the transfer and processing of data for the pre-heating are not required, whereby the printing speed can be significantly increased.

Further, the pre-heating which is not dependent on the simple inversion of the preceding print data but depends on the logical product of the inversion of the preceding print data and the instant print data can be realized with a simple structure of hardware, whereby the requisite temperature rise, reduction of the power consumption and the sufficient preheating duration can be realized without increasing the burden of the control circuits of the controller.

In the foregoing description, the invention has been assumed to relate to the transfer type thermal printing method. However, the invention can equally be applied to the coloration type thermal printing. Further, the invention can be applied to the printing not only of characters but also of signs, geometric patterns and the like and enjoy universal applications.

From the foregoing, it is apparent that the present invention has now provided a thermal printing method which can assure improved quality of the printed images produced by a serial type high-speed thermal printer and a thermal printing head provided with the driver circuit designed for performing the aimed correction in consideration of the preceding state of operation.

I claim:

1. A thermal printing method, comprising the steps, for each of plural thermal elements disposed on a printing head, a step of inverting data printed in a preceding print cycle, a step of obtaining a logical product of the inverted data resulting from said inverting step and data to be printed in the instant print cycle, a step of preheating each of said thermal elements in dependence on said logical product, and a step of heating each of said thermal elements in dependence on the data to be printed in the instant print cycle for printing the data.

2. A thermal printing method according to claim 1, wherein said thermal elements are divided into two groups along the direction in which said printing head is moved, and said thermal elements are alternately driven on the group basis.

3. A thermal printer, comprising:

(a) a printing head disposed movably for printing operation;

(b) a plurality of thermal elements disposed on said printing head; and (c) printing head drivers mounted on said printing head, each of said drivers including a first register means for storing data to be printed in the instant print cycle and outputting said data in parallel, a second register means for storing the data printed in a preceding print cycle outputted in parallel from said first register means and outputting said data after having been inverted for enabling preheating of each of said thermal elements, said second register means being reset for outputting data of logic "1" for enabling heating of each of said thermal elements for printing of said data to be printed in the instant print cycle, a logical product circuit for determining a logical product of the parallel outputs of said first and second register means for each data, and switching means for interrupting currents flowing to said thermal elements corresponding to each data in dependence on the logical product determined for each data.

4. A thermal printer according to claim 3, wherein said plurality of thermal elements are classified into a first group of thermal elements and a second group of thermal elements along the direction in which said printing head travels, the individual thermal elements of each group being aligned in a row in the direction perpendicular to the traveling direction of said printing head, the thermal elements of said first and second groups being driven alternately with each other.

5. A thermal printer according to claim 3, wherein said first register means is constituted by a shift register having a data input terminal and a clock input terminal, said second register means being constituted by data latches each provided for each data and having a latch input terminal and a latch reset input terminal to which respective inputs are applied through associated inverters, said switching means being constituted by NAND circuits each having a strobe input terminal to which a strobe signal is applied through an inverter.

* * * * *